United States Patent [19]

Bowen et al.

[11] 4,275,972
[45] Jun. 30, 1981

[54] MITRE JOINT AND FASTENER THEREFOR

[76] Inventors: Michael W. Bowen; Andrew C. Bowen, both of 1847 Parr Hwy., Adrian, Mich. 49221

[21] Appl. No.: 10,493

[22] Filed: Feb. 8, 1979

[51] Int. Cl.³ .......................... F16B 7/04; A47G 1/10; F16B 12/10
[52] U.S. Cl. .................................. 403/401; 403/231; 403/294; 40/155
[58] Field of Search ............... 403/401, 402, 405, 294, 403/295, 231; 40/152 R, 155

[56] References Cited

U.S. PATENT DOCUMENTS

| 277,076 | 5/1883 | Stuart | 403/401 X |
| 1,136,811 | 4/1915 | Kazansky et al. | 403/231 X |
| 1,826,869 | 10/1931 | Everett | 403/294 X |
| 4,055,910 | 11/1977 | Schmidt | 40/152 R X |

FOREIGN PATENT DOCUMENTS 109797 2/1944 Sweden.

Primary Examiner—James Kee Chi
Attorney, Agent, or Firm—William Preston Hickey

[57] ABSTRACT

A mitre joint for picture frames and the like, wherein abutting portions of two members have pockets milled therein that are spaced a predetermined distance inwardly from their abutting surfaces. In addition, channels connect the pockets with the abutting surfaces. A foreshortenable fastener comprising a four sided hollow body, having front, back, top and bottom sides, is positioned in the adjacent channels, with the front and back sides positioned in the pockets. The front and back sides are wider than the top and bottom sides, which extend through the channels, and a screw extends through a hole in the top side into threaded engagement with the bottom side to bow the bottom side inwardly when the screw is tightened. This foreshortens the fastener and pulls the mitre joint together.

12 Claims, 10 Drawing Figures

MITRE JOINT AND FASTENER THEREFOR

The present invention relates to a new and improved joint between abutting structures, and to new and improved foreshortenable fasteners which make the joining structure feasible.

BACKGROUND OF THE INVENTION

The present invention arose from a long standing problem that has existed in mitre joints and particularly the mitre joints of picture frames and the like. Picture frames may be glazed or unglazed, but in either case, a need exists for an inexpensive fastener which will permit the frames to be put together and taken apart easily. In the case of unglazed frames, the invention permits what would otherwise be a bulky structure, to be shipped and stored in knocked down form, thereby greatly reducing their cost to the ultimate consumer.

The picture frames with which we are more particularly concerned are fragile structures that may be quite thin in certain areas, and which may be made of relatively soft materials. In many instances, the prior art has abutted the members to be joined, and has driven fasteners into their ends to hold the mitre joint together. The prior art structures have included corrugated strips, and variously shaped wedges; and the driving of such fasteners into the ends of the members forming the mitre joint will split the members, if the wedges are not driven into the adjoining structures in a delicate manner.

An object of the present invention, therefore, is the provision of a construction of mitre joint having pockets in each of the ends of the members to be joined, and a foreshortenable fastener bridging the pockets in such manner that the fastener can be easily foreshortened to bring and hold the two ends of the members together.

Another object of the present invention is the provision of a new and improved joint of the above described type in which the pockets have a configuration that can be easily formed by a routing or milling operation that guides off of the joining surfaces.

Another object of the present invention is the provision of a new and improved foreshortenable fastener that is preferably made of a yieldable material that will accommodate and distribute the foreshortening forces over considerable areas of the members to be joined.

Still another object of the present invention is the provision of a new and improved fastener of the above described type which is made of a relatively soft material such as plastic so that it will not damage the end of the members being joined.

Further objects and advantages of the invention will become apparent to those skilled in the art to which the invention relates from the following description of the preferred embodiments described with reference to the accompanying drawings.

DESCRIPTION OF THE PREFERRED EMBODIMENTS

Figure 1:
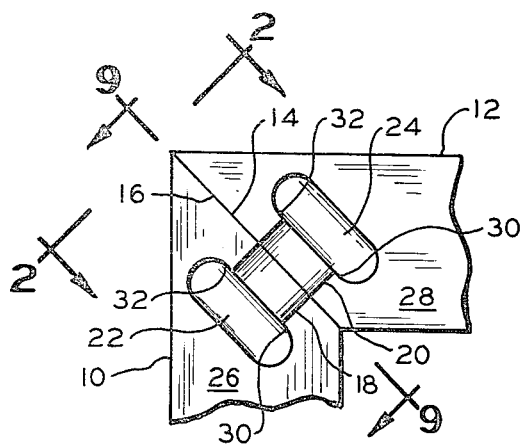
FIG. 1 is a plan view of a mitre joining embodying principles of the present invention.
Figure 2:
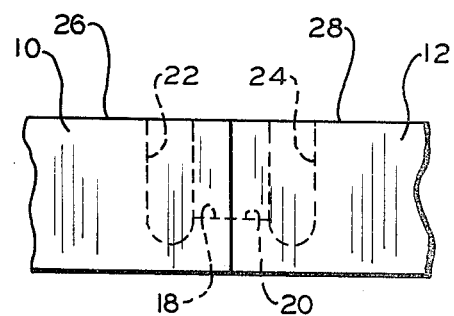
FIG. 2 is a side view of the mitre joint shown in FIG. 1.
Figure 3:
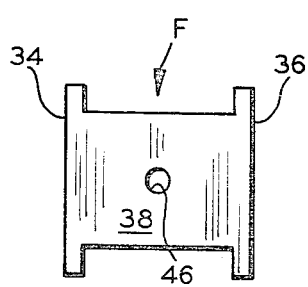
FIG. 3 is a plan view of a foreshortenable fastener to be used with the structure shown in FIGS. 1 and 2.
Figure 4:
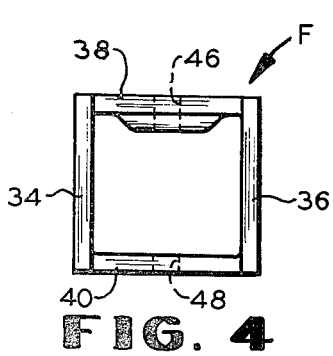
FIG. 4 is a side view of the foreshortenable fastener shown in FIG. 3.
Figure 5:
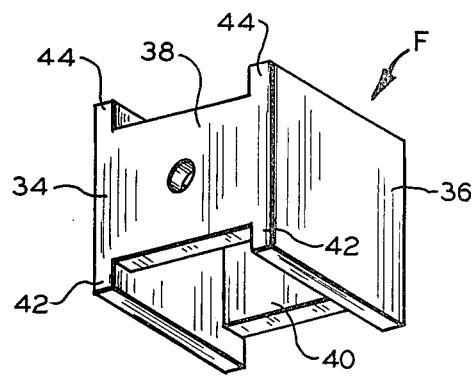
FIG. 5 is an isometric view of the fastener shown in FIGS. 3 and 4.

The joint shown in the drawing is a mitre joint between the ends of adjacent members 10 and 12, which in the present instance are adjacent members of a picture frame. The abutting end surfaces 14 and 16 of the respective members 10 and 12 have channels 18 and 20 formed therein. The channels 18 and 20 extend from the abutting end surfaces inwardly of the members, to pockets 22 and 24, which extend from the top surfaces 26 and 28 down into the respective members, but terminating short of their bottom surfaces. The channels and pockets are of a special design which permit them to be made by a router, or milling machine using a bit having an enlarged circular end portion corresponding to the diameter of the pockets 22 and 24 and an intermediate portion conforming to the diameter of the channels 18 and 20. The difference in diameter between the channels 18 and 20 and the pockets 22 and 24 provide shoulders 30 and 32 on opposite sides of the channels that are abutted by a fastener for the structure which is about to be described.

Although the foreshortenable fastener which cooperates with the structure above described may be variously embodied, it is shown in FIGS. 3-8 as being made from plastic, either molded or an extruded shape cut into appropriate lengths, and the ends of which are contoured, to give the configuration shown. The foreshortenable fastener F is a four sided hollow tubular section having front, back, top, and bottom sides 34, 36, 38 and 40 respectively. The fasteners F are generally symmetrical about a plane intended to coincide with the abutting surfaces 14 and 16 of the mitre joint. The top and bottom surfaces 38 and 40 have a width which is less than that of the front and back sides 34 and 36, to provide equal and opposite projections to the front and rear sides, which are adapted to abut the shoulders 30 and 32, respectively. The top and bottom surfaces 38 and 40 have a width that is slightly narrower than are the channels 18 and 20, so that the fastener F can be slid downwardly into the pockets 22 and 24 from the top surface of the members 10 and 12. The top side 38 is made stiffer than is the bottom side 40 for reasons which will later be explained. The top side 40 has a generally centrally located opening 46 therethrough that is larger in diameter than is a corresponding but smaller opening 48 in the bottom side 40.

Figure 6:
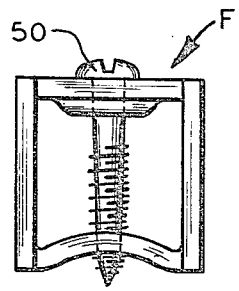
FIG. 6 is a side view of the fastener shown in FIGS. 3-5 and similar to FIG. 4, but shows a sheet metal screw tightened in place to foreshorten the top and bottom sides.

In the preferred embodiment shown in FIGS. 5-8, the top side 38 is thicker in its center portion than are its junctures with the front and back sides 34 and 36 so that some fluxture is accommodated between the sides 34 and 36 and the top side 38. This will usually be a bending action as will later be explained. The bottom side 40 is of generally thinner section than is the top side 38; so that it will bow as shown in FIG. 6 when a sheet metal screw 50 which extends through the opening 46 into engagement with the opening 48. Upon tightening of the sheet metal screw 50, the bottom ends of the front and back sides 34 and 36 converge inwardly. The convergence in the embodiment now being described, is greater at the bottom than it is at the top. This is desirably so, so that greater foreshortening occurs adjacent the center of the members 10 and 12, than occcurs at their top surface. The foreshortenable fastener is made out of plastic so that it will yieldingly accommodate resistance of the members being joined and thereby prevent concentrated loads from being produced which might otherwise break out the wood or other material from which the members 10 and 12 are made. It will be seen that the hollow opening of the extruded section is of constant cross section which is rounded at the corners and otherwise contoured to provide the desired wall thicknesses of the various sides.

Figure 7:
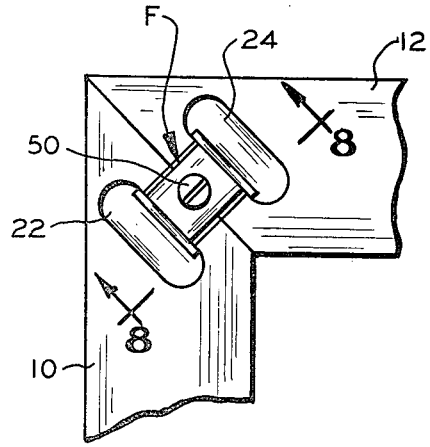
FIG. 7 is a plan view of a mitre joint similar to FIG. 1, but showing the fastener in place.
Figure 8:
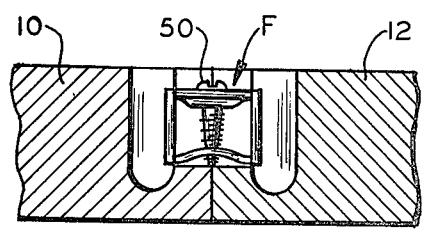
FIG. 8 is a side view of the mitre joint shown in FIG. 7.
Figure 9:
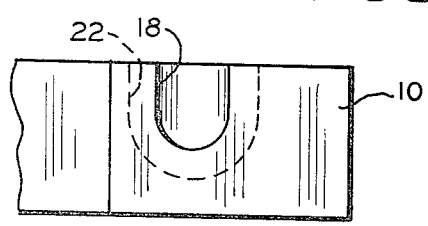
FIG. 9 is a sectional view taken on the line 9—9 of FIG. 1.

The fastener F is used by sliding it downwardly into the channels and pockets 18 and 20, and 22 and 24, respectively, from the top surface of the members 10 and 12. The projections 42 and 44 are positioned opposite shoulders 30 and 32 and the top side 38 is positioned slightly beneath the top surface of the members 10 and 12. Thereafter, the screw 50 is tightened to bow the bottom side 40 in the general manner shown in FIG. 6 to thereby foreshorten the fastener and bring the projections 42 and 44 into tight engagement with the shoulders 30 and 32. This can easily be done by an amateur who would have received a knocked down picture frame, using only a screwdriver such as is available in every household. What is more, this construction permits picture frames to be assembled on a production line, by power driven screwdrivers without overtightening or damaging the members 10 and 12. FIGS. 7 and 8 are intended to show the assembled mitre joint, and the approximate shape assumed by the fastener F. The shape shown is slightly exaggerated, however, since the plastic is stretchable or yieldable to such an extent that the tapering of the front and back sides 34 and 36 is largely prevented by the resistance of the abutting material of the members 10 and 12. It is believed that FIG. 8, however, although exaggerated, conveys the type of action that is produced by the fastener. It definitely shows that the embodiment of FIGS. 5–8 produces greater tightening action adjacent the center of the members 10 and 12 than it does adjacent their top surfaces. As previously explained, this action is desirable in many instances to present damage to the members 10 and 12. It will be understood, however, that in some instances it may be desirable to bow the top side 38 toward the bottom side 40, and this can be done by making the top and bottom sides of approximately the same thickness.

Figure 10:
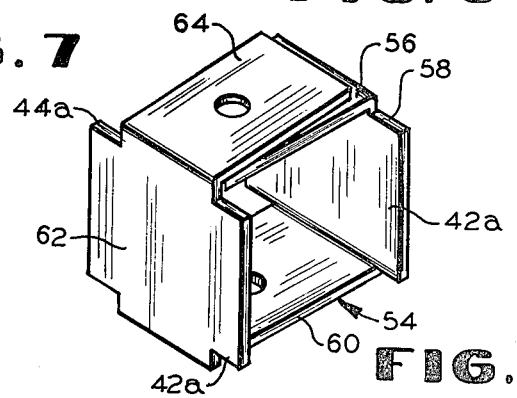
FIG. 10 is an isometric view of another embodiment of the invention.

The embodiment of fastener shown in FIG. 10 is generally shaped in the same manner as the embodiment previously described, but has a configuration permitting it to be made out of a stamped piece of sheet metal. The piece of sheet metal 54 has five sections 56, 58, 60, 62 and 64 with the sections 56 and 64 corresponding to the top side of the finished configuration, section 58 providing the back side, section 60 providing the bottom side, and section 62 the front side. Sections 56 and 64 overlap each other to thereby provide a top side that is stiffer than the bottom side 54 to provide generally the same bowing action that has been previously described. The remaining portions of the embodiment shown in FIG. 10 which correspond to similar portions of the embodiment previously described are designated by a like reference numeral characterized further in that a subscript "a" is affixed thereto.

It will be apparent that the fastener F is a part of the joint structure shown in FIGS. 7 and 8, and can be made from various materials, and can have its shape slightly modified to suit particular needs, without departing from the principles of the present invention. In some instances, for example, threaded member 50 would be replaced by one having opposite hand threads which respectively engage threaded openings in the top and bottom sides, so that turning of the threaded member would bow the top and bottom sides simultaneously. It has previously been indicated that this may have advantages for some particular application. Other modifications will occur to those skilled in that art, after studying the principles that are embodied in the invention so far described.

While the invention has been described in considerable detail, we do not wish to be limited to the particular embodiments shown and described; and it is our intention to cover hereby all novel adaptations, modifications, and arrangements thereof which come within the practice of those skilled in the art to which the invention relates.

We claim:

1. A mitre joint for picture frames and the like comprising: two members to be joined having juxtaposed surfaces to be held together; a pocket hollowed out in each member inwardly from their juxtaposed surfaces; a channel in each member communicating its pocket with said juxtaposed surfaces, said channel having a width that is less than that of said pockets to leave pocket gripping surfaces on opposite sides of said channels; a foreshortenable fastener extending across said channels with opposite end flanges in said pockets, said flanges being constructed and arranged to abut said pocket gripping surfaces, said foreshortenable fastener having top and bottom sides extending between said opposite end flanges, and means for bowing at least one of said top and bottom sides toward the other.

2. The mitre joint of claim 1 wherein: said last mentioned means is a threaded member which passes through one of said top and bottom sides and has threaded engagement with the other one of said sides to pull the sides towards each other when the threaded member is rotated.

3. The mitre joint of claim 1 wherein said foreshortenable member is a hollow four sided member having front, back, top and bottom sides with the front and back sides being positioned in said pockets, and the top and bottom sides being positioned in said channels, said top and bottom sides having generally centrally located openings therethrough; and a threaded member extending through said openings and arranged to bow said top and bottom sides together when the threaded member is rotated.

4. The mitre joint of claim 3 wherein said foreshortenable member is a section of four sided extruded section with two sides thereof being the top and bottom sides and the two other sides being the front and back sides, said top and bottom sides being made narrower than said front and back sides to provide said flanges for abutting said pocket gripping surfaces.

5. The mitre joint of claim 4 wherein said top side is stiffer than said bottom side.

6. The mitre joint of claim 5 wherein said threaded member is a screw.

7. The mitre joint of claim 1 wherein: said foreshortenable fastener is a five surfaced section of bent sheet metal with the first and fifth surfaces paralleling each other to form said top side of the fastener.

8. A fastener for a mitre joint and the like comprising: a hollow four sided member having front, back, top and bottom sides; said front and back sides being wider than the top and bottom sides; said top and bottom sides having generally centrally located openings therethrough; and tightening means for squeezing said top and bottom sides toward each other; and whereby the tightening of said means brings portions of the front and back sides toward each other.

9. The fastener of claim 8 wherein: the top side is stiffer than the bottom side and said tightening means is a screw having threaded engagement with the bottom side only, and whereby the bottom portions of the front and back sides are drawn together more than at the top portions.

10. The fastener of claim 8 wherein: said sides are formed of a hollow extruded plastic section with the axis of extrusion extending through the open sides of said member.

11. The fastener of claim 8 wherein said tightening means is a screw.

12. The fastener of claim 8 wherein: said four sided member is a bent piece of sheet metal having five sections with the first and fifth section overlapping each other to give a double thickness for said top side of said hollow four sided member.

* * * * *